(12) United States Patent
Montgomery (10) Patent No.: US 11,660,810 B2
(45) Date of Patent: *May 30, 2023

(54) ADAPTABLE HIGH-PERFORMANCE EXTRUSION HEAD FOR FUSED FILAMENT FABRICATION SYSTEMS

(71) Applicant: Slice Engineering LLC, Gainesville, FL (US)

(72) Inventor: Christopher Mark Montgomery, Austin, TX (US)

(73) Assignee: Slice Engineering, LLC, Gainesville, FL (US)

( * ) Notice: Subject to any disclaimer, the term of this patent is extended or adjusted under 35 U.S.C. 154(b) by 218 days.

This patent is subject to a terminal disclaimer.

(21) Appl. No.: 17/100,506

(22) Filed: Nov. 20, 2020

(65) Prior Publication Data
US 2021/0069973 A1 Mar. 11, 2021

Related U.S. Application Data

(63) Continuation of application No. 15/981,615, filed on May 16, 2018.
(Continued)

(51) Int. Cl.
*B29C 64/20* (2017.01)
*B29C 64/209* (2017.01)
(Continued)

(52) U.S. Cl.
CPC .......... *B29C 64/209* (2017.08); *B29C 64/106* (2017.08); *B29C 64/118* (2017.08); *B33Y 30/00* (2014.12); *B29L 2031/767* (2013.01)

(58) Field of Classification Search
CPC ..... B29C 64/209; B29C 64/106; B29C 47/80; B29C 67/00; B29L 2031/767;
(Continued)

(56) References Cited

U.S. PATENT DOCUMENTS 9,877,806 B2 * 1/2018 Tenne .................... C25D 15/02
2016/0236408 A1 * 8/2016 Wolf .................... B29C 64/106
(Continued)

OTHER PUBLICATIONS

"How to specify Hypodermic tubing" by Micro Group (Year: 2020).*

*Primary Examiner* — Alison L Hindenlang
*Assistant Examiner* — Shibin Liang
(74) *Attorney, Agent, or Firm* — McAndrews, Held & Malloy, Ltd.

(57) ABSTRACT

An extrusion head for a three-dimensional printer is disclosed including a feed tube, a heater, a cooler, and a bridge. The feed tube can be made of metal and has an inlet for receiving a forwardly driven filament of solid deposition material, an outlet, a downstream portion adjacent to the outlet, an upstream portion upstream from the downstream portion, and an internal passage extending from the inlet to the outlet. The heater is thermally coupled with the downstream portion of the feed tube for heating a filament to provide softened fluid deposition material. The cooler is thermally coupled with the upstream portion and spaced generally axially from the heater to define a generally axially extending gap traversed by the feed tube. The bridge traverses the gap and provides a rigid mechanical connection between the heater and the cooler.

20 Claims, 4 Drawing Sheets

Related U.S. Application Data

(60) Provisional application No. 62/507,728, filed on May 17, 2017.

(51) Int. Cl.
*B33Y 30/00* (2015.01)
*B29C 64/106* (2017.01)
*B29C 64/118* (2017.01)
*B29L 31/00* (2006.01)

(58) Field of Classification Search
CPC ......... B33Y 10/00; B33Y 30/00; B33Y 40/00; B33Y 50/02; H05K 3/10; H05K 1/02
See application file for complete search history.

(56) References Cited

U.S. PATENT DOCUMENTS

| | | | |
|---|---|---|---|
| 2017/0064840 A1* | 3/2017 | Espalin | B33Y 80/00 |
| 2017/0217089 A1* | 8/2017 | Batchelder | B33Y 50/02 |
| 2019/0118467 A1* | 4/2019 | Neboian | B41J 2/51 |
| 2019/0184633 A1* | 6/2019 | Sydow | B29C 35/16 |

* cited by examiner

ADAPTABLE HIGH-PERFORMANCE EXTRUSION HEAD FOR FUSED FILAMENT FABRICATION SYSTEMS

CROSS-REFERENCE TO RELATED APPLICATION

This application is a continuation application of co-pending U.S. patent application Ser. No. 15/981,615, filed May 16, 2018, which claims the priority of U.S. Provisional App No. 62/507,728, filed May 17, 2017. The entire content of both U.S. patent application Ser. No. 15/981,615 and U.S. Provisional App No. 62/507,728 is incorporated by reference herein.

BACKGROUND OF THE INVENTION

The invention relates to the thermal dispensing head for depositing layers of solidifying material in a desired pattern to form three-dimensional physical objects. The modeling material is selected and its temperature is controlled so that it solidifies upon extrusion from the dispensing head onto a base, with the build-up of multiple layers forming the desired article. This method of fabrication is often called Fused Filament Fabrication (FFF), and the thermal dispensing head for a FFF machine is often called the hot end.

Examples of apparatus and methods for FFF of three-dimensional objects by depositing layers of solidifying material are described in Crump U.S. Pat. No. 5,121,329; Batchelder et al. U.S. Pat. No. 5,303,141; Crump U.S. Pat. No. 5,340,433; Batchelder U.S. Pat. No. 5,402,351; Batchelder U.S. Pat. No. 5,426,722; Crump et al. U.S. Pat. No. 5,503,785; Abrams et al. U.S. Pat. No. 5,587,913; and Swanson et al. U.S. Pat. No. 6,004,124. The systems disclosed in the '329, '433, '785 patents and '124 patents, for example, describe an extrusion head which receives a solid state material used to form three dimensional articles, heats the material to above its solidification temperature, and dispenses the material as a fluid onto a base.

Various embodiments of the extrusion head are shown in the Crump '433 patent. Each embodiment includes a liquefier which consists of three zones: an entrance zone or cap, a heating zone or body and a nozzle. A first embodiment is shown in FIG. 3 of the '433 patent. FIG. 3 shows a liquefier within an extrusion head having a seal ring (i.e., a cap), a heating head (i.e., heating zone) and a nozzle. The seal ring receives a supply rod of solid material. An electric heater within the heating head heats the supply rod to a temperature exceeding its solidification temperature, reducing it to a liquid state. The liquid material then flows into the nozzle through a nozzle flow passage, and is dispensed through a nozzle dispensing outlet.

A second embodiment of the extrusion head is shown in FIG. 5 of the Crump '433 patent. In this embodiment, the supply material is in the form of a flexible strand in solid form. The flexible filament of material shown in FIG. 5 is fed through a guide sleeve to an extrusion head. The extrusion head contains a supply chamber in a top portion and a liquefier in a bottom portion. Drive rollers within the supply chamber introduce the flexible strand into the liquefier. The liquefier within the extrusion head includes a seal ring (i.e., a cap), a material supply and flow passage (i.e., heating zone) and a dispensing outlet orifice (i.e., a nozzle). The flexible strand is advanced into the liquefier through the seal ring, which provides a hydraulic seal around the internal surface of the flow passage. A heater in the form of a sleeve containing a heating coil is positioned around the flow passage and the orifice to heat the strand to a fluid state in the passage. The material is dispensed in a fluid state through the orifice.

A third embodiment of the extrusion head is shown in FIG. 13 of the Crump '433 patent. As with the embodiment shown in FIG. 5, the material is supplied in the form of a flexible strand in solid form. The strand is advanced into an extrusion head through a guide sleeve. A strand advance mechanism comprising a pair of motor-driven feed rollers or pulleys and advances the strand into the liquefier. The liquefier of FIG. 13 is comprised of a tubular guide member, a seal ring, a liquefier nozzle and a removable tip. The tubular guide member and seal ring together form the cap zone. The tubular guide member is made of highly conductive metal. It dissipates heat rapidly to maintain the flexible strand at a suitable temperature during its movement from the strand advance mechanism into the heating zone. To further dissipate heat from the guide member, a blower may be used to circulate air into the extrusion head, around the guide member. At its lower end, the guide member is supported on the seal ring. The seal ring is made out of heat-insulating plastic to serve as a thermal seal. The liquefier nozzle surrounded by a heating coil and an outer insulation sleeve provides a heating zone in which the strand material is melted. The liquefier nozzle (i.e., heating tube) is made of heat-conducting material. The removable tip is attached to the bottom end of the liquefier nozzle by a threaded connection.

A fourth embodiment of the extrusion head is shown in FIG. 6 of the Crump '433 patent. In this embodiment, multiple materials are dispensed through separate passages into a single discharge outlet. The embodiment of FIG. 6 allows utilization of different materials to form different layers of the same article.

The Crump '785 patent discloses an extrusion head carrying two liquefiers, each having its own nozzle. The liquefiers of the '785 patent each have a cap at a receiving end, secured by a mounting ring to a tubular dispenser (i.e., heating tube). A heating coil is wrapped around each tubular dispenser to heat and melt a filament of material. In each liquefier, the material is provided in a fluid state to a dispensing nozzle and discharged through a nozzle tip. Filament is conveyed to each liquefier from a supply spool by a pair of pinch rollers driven by stepper motors.

In the aforementioned liquefiers, the cap region serves as the transition zone for the modeling material where at the entrance to the cap the temperature is below the softening point of the material and the outlet of the cap is above the temperature required to pump the material in a semi-liquid state. This requires a change in temperature of up to 250° Celsius over the length of the cap. Ideal properties for the cap are a high thermal resistivity in the axial direction and low thermal resistivity in the radial direction. Designs such as those described in the Crump patents used high temperature thermoplastics or thermosets such as Dupont "Vespel" SP-1, for the cap to accomplish these goals. These caps have temperature limitations and require a sealing mechanism between the cap and the heating body, which is typically formed of aluminum. The caps and seal are prone to leakage.

A fifth embodiment of the extrusion head is shown in FIG. 9 of the '124 patent. In this embodiment, a liquefier formed of a single piece of thin-wall tubing is encased in a heating block. The tube acts as both the hot zone and the cold zone of the liquefier. The nozzle can be formed by swagging the metal tube to a nozzle, or it may be brazed or welded to the bottom of the tube. The heating block is made of heat conductive materials.

The thin-wall tube has an inlet end for receiving a filament of molding material and an outlet end for delivering the material in liquid form. A first section of the tube adjacent the inlet end functions as the entrance or cap zone. This first section of the tube is exterior to the heating block. The tube has a second section which passes through the heating block forming a heating zone. The nozzle connects to the outlet end of the tube. The cap zone of the tube must dissipate heat rapidly to maintain the flexible strand at a suitable temperature during its movement into the heating zone, so that the strand will not become limp and buckle. A stainless steel tube having a wall thickness in the range of 0.008-0.015 inches and an interior diameter of 0.07 inches is specified in the '124 patent.

Example products include: E3D V6, Prusa MKII, Lulzbot Hexagon, Dyze Dyzend-X and many others.

SUMMARY OF THE INVENTION

An aspect of the invention is an extrusion head for a three-dimensional printer. The extrusion head includes a feed tube, a heater, a cooler, and a bridge.

The feed tube can be made of metal and extends generally axially. The feed tube has an inlet for receiving a forwardly driven filament of solid deposition material, an outlet, a downstream portion adjacent to the outlet, an upstream portion upstream from the downstream portion, and an internal passage extending from the inlet to the outlet.

The heater is thermally coupled with the downstream portion of the feed tube for heating a filament positioned within the feed tube internal passage to provide softened fluid deposition material.

The cooler is thermally coupled with the upstream portion for reducing upstream heat transfer. The cooler is spaced generally axially from the heater to define a generally axially extending gap traversed by the feed tube.

The bridge is spaced radially from the metal feed tube, traverses the gap, and provides a rigid mechanical connection between the heater and the cooler.

Other aspects of the invention are described or will become apparent from the following description and the drawing figures.

A list of the reference characters used in the drawings follows.

100 Extrusion Head
101 Cooler
102 Heater
103 Nozzle
104 Feed Tube
105 Second Cooler
106 Bushing
107 Spacer
108 Tension Member
109 Inlet (of 104)
110 Filament
111 Outlet (of 104)
112 Downstream Portion (of 104)
113 Upstream Portion (of 104)
114 Internal Passage (of 104)
115 Softened Deposition Material
116 Gap
117 Bridge
118 Platform
119 Three-Dimensional Printer
120 Heating Element
121 Temperature Sensor
122 Threaded Bore (of 102)
123 External Thread (of 112)
124 Axial Bore (of 106)
125 Exterior Threaded Surface (of 106)
126 Inlet (of 122)
127 Outlet (of 122)
128 First Thermally Conductive Portion
129 Second Thermally Conductive Portion
130 Thermally Conductive Flange Portion
131 Internal Heat Transfer Passage
132 Cooling Fluid 133 Sleeve (Heat Sink)
134 First Portion (of 107)
135 Second Portion (of 107)

DETAILED DESCRIPTION OF THE DISCLOSURE

Figures 1, 2, 3, 4, 5, 6, 7, 8, 9:
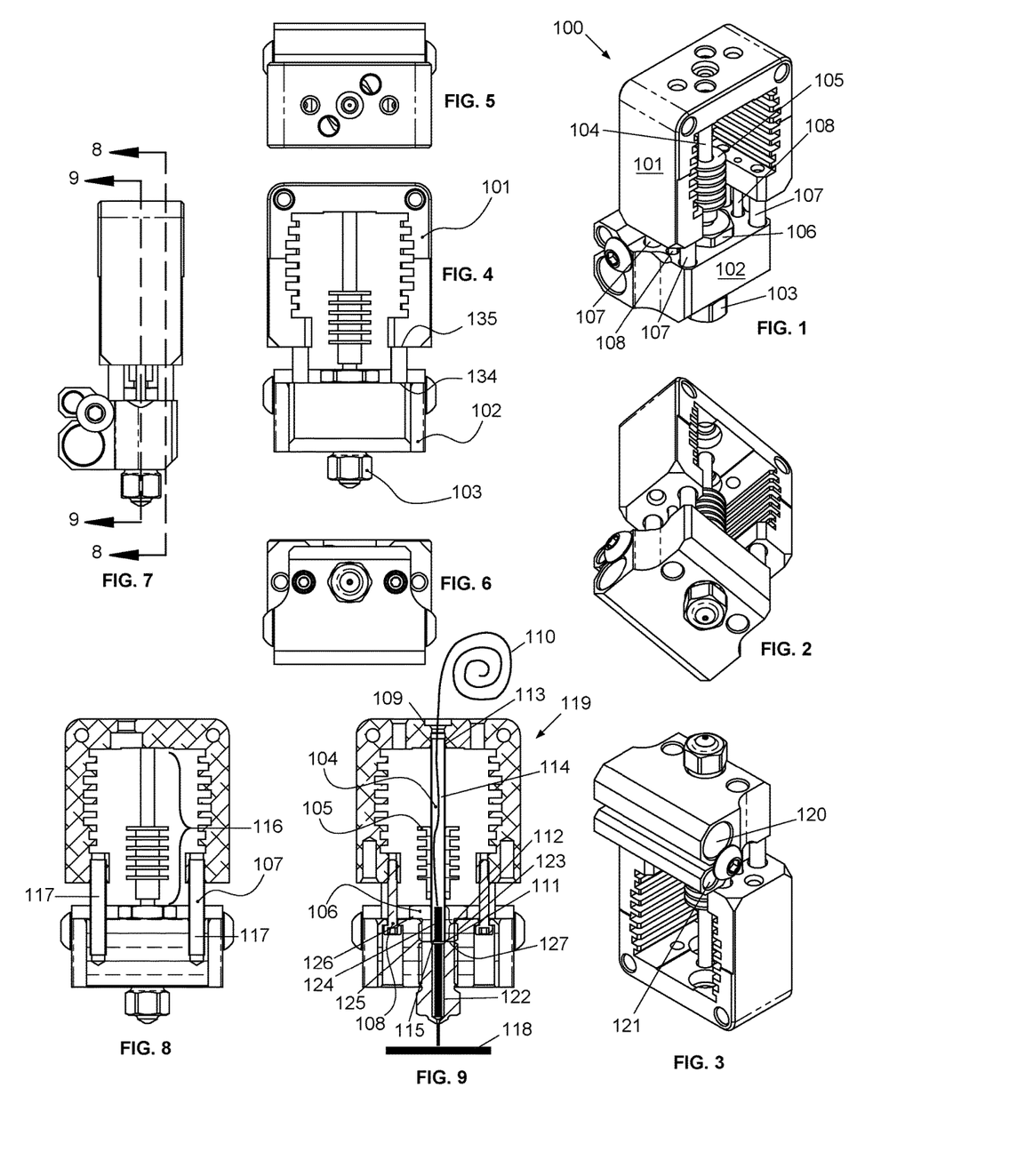
FIGS. 1, 2, and 3 are perspective views of an embodiment of the extrusion head.
FIG. 4 is a front elevation view of an embodiment of the extrusion head of FIGS. 1 through 3.
FIG. 5 is a top plan view of an embodiment of the extrusion head of FIGS. 1 through 3.
FIG. 6 is a bottom plan view of an embodiment of the extrusion head of FIGS. 1 through 3.
FIG. 7 is a side elevation view of an embodiment of the extrusion head of FIGS. 1 through 3.
FIG. 8 is a section view taken along section lines 8-8 of FIG. 7 of an embodiment of the extrusion head of FIGS. 1 through 3.
FIG. 9 is a section view taken along section lines 9-9 of FIG. 7 of an embodiment of the extrusion head of FIGS. 1 through 3.
Figures 10, 11, 13, 14, 15:
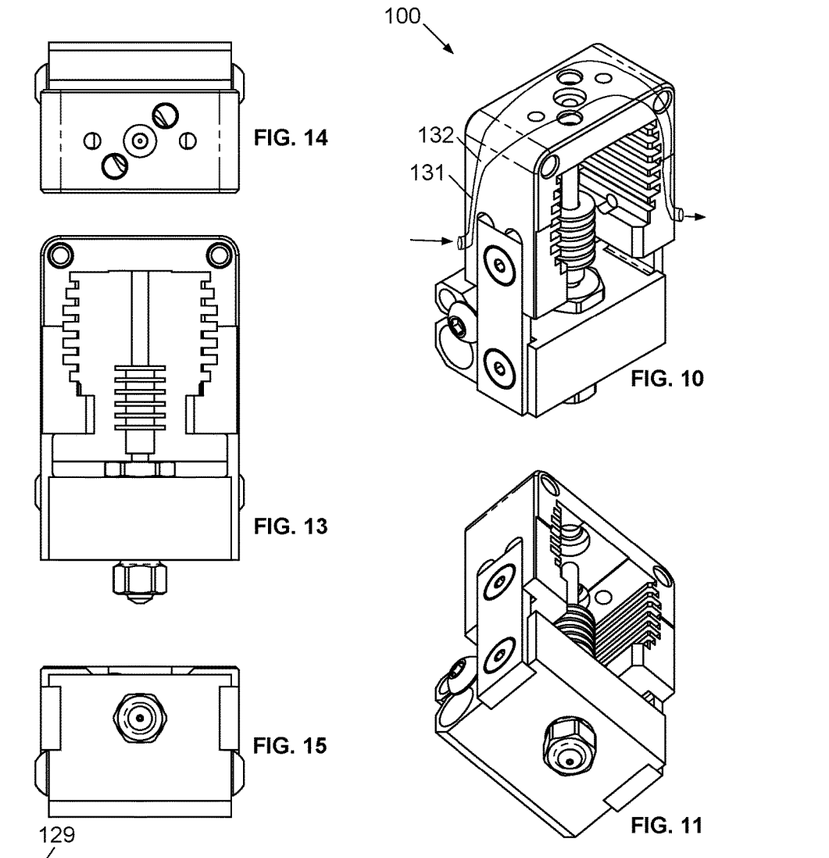
FIGS. 10 through 12 are perspective views of an embodiment of the extrusion head.
FIG. 13 is a front elevation view of an embodiment of the extrusion head of FIGS. 10 through 12.
FIG. 14 is a top plan view of an embodiment of the extrusion head of FIGS. 10 through 12.
FIG. 15 is a bottom plan view of an embodiment of the extrusion head of FIGS. 10 through 12.
Figure 12:
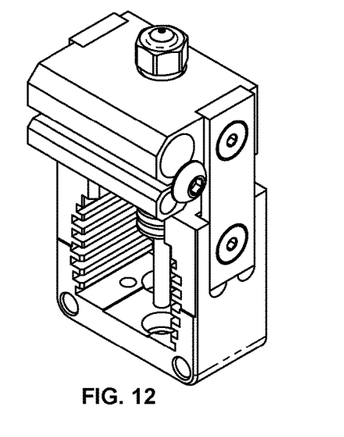
Figure 16:
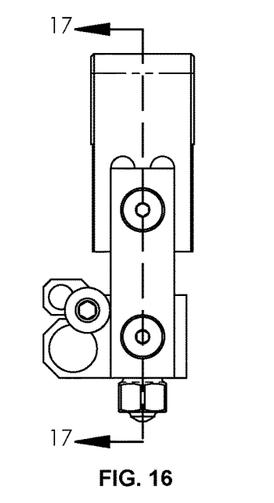
FIG. 16 is a side elevation view of an embodiment of the extrusion head of FIGS. 10 through 12.
Figure 17:
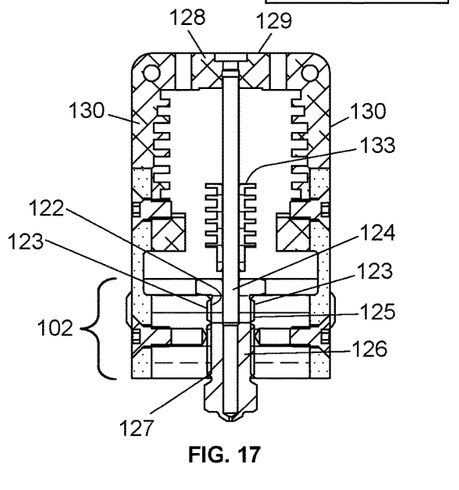
FIG. 17 is a section view taken along section lines 17-17 of FIG. 16 of an embodiment of the extrusion head of FIGS. 10 through 12.
Figures 18, 19:
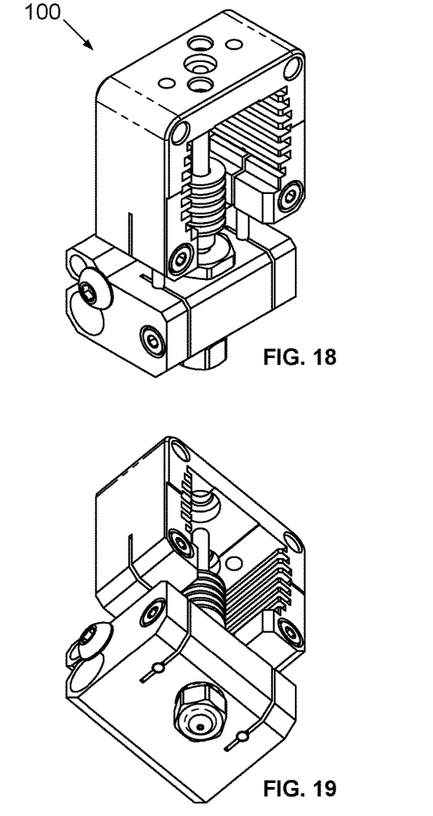
FIGS. 18 through 20 are perspective views of an embodiment of the extrusion head.
Figure 20:
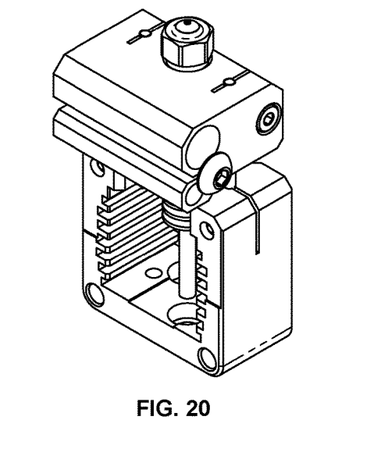
Figure 21:
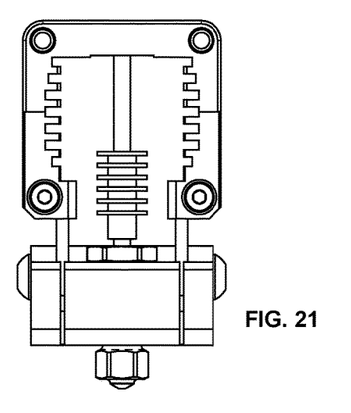
FIG. 21 is a front elevation view of an embodiment of the extrusion head of FIGS. 18 through 20.
Figure 22:
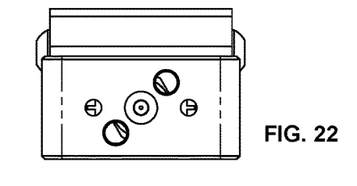
FIG. 22 is a top plan view of an embodiment of the extrusion head of FIGS. 18 through 20.
Figure 23:
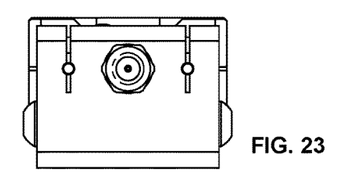
FIG. 23 is a bottom plan view of an embodiment of the extrusion head of FIGS. 18 through 20.
Figure 24:
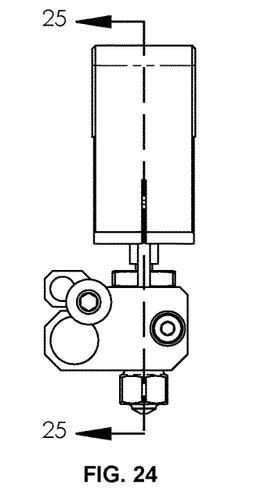
FIG. 24 is a side elevation view of an embodiment of the extrusion head of FIGS. 18 through 20.
Figure 25:
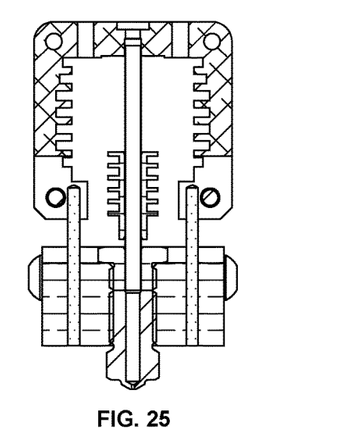
FIG. 25 is a section view taken along section lines 25-25 of FIG. 24 of an embodiment of the extrusion head of FIGS. 18 through 20.
Figure 26:
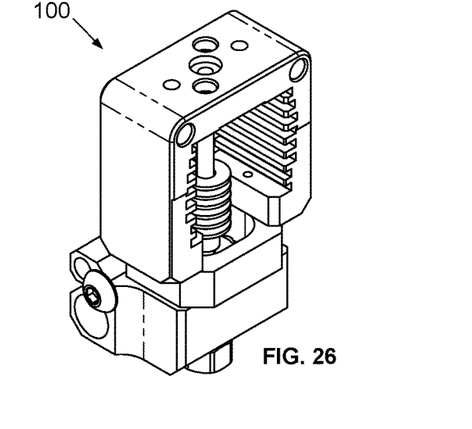
FIGS. 26 through 28 are perspective views of an embodiment of the extrusion head.
Figure 27:
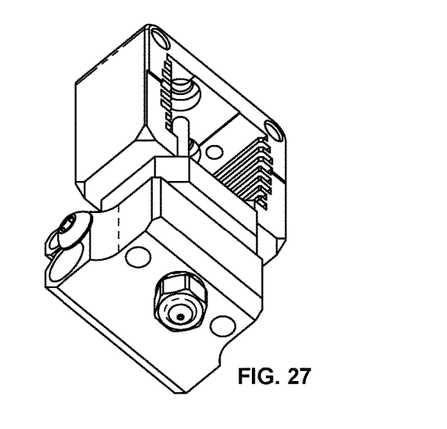
Figure 28:
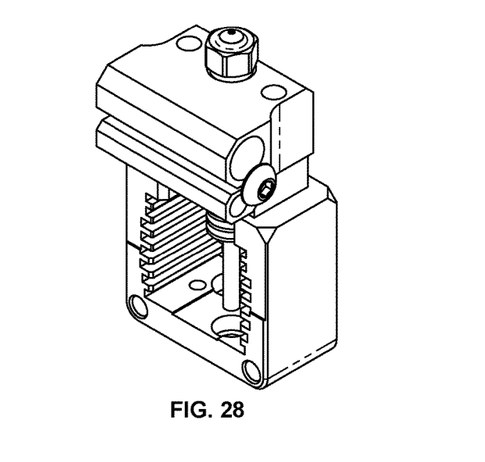
Figure 29:
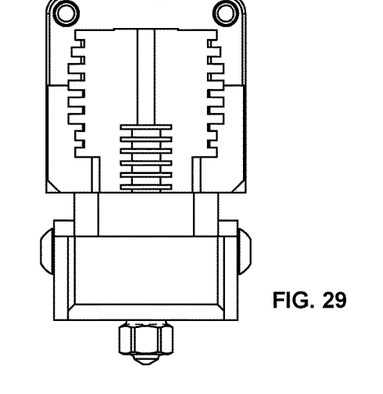
FIG. 29 is a front elevation view of an embodiment of the extrusion head of FIGS. 26 through 28.
Figure 30:
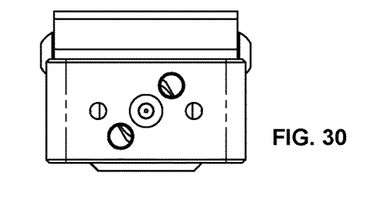
FIG. 30 is a top plan view of an embodiment of the extrusion head of FIGS. 26 through 28.
Figure 31:
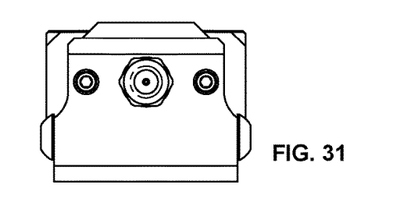
FIG. 31 is a bottom plan view of an embodiment of the extrusion head of FIGS. 26 through 28.
Figure 32:
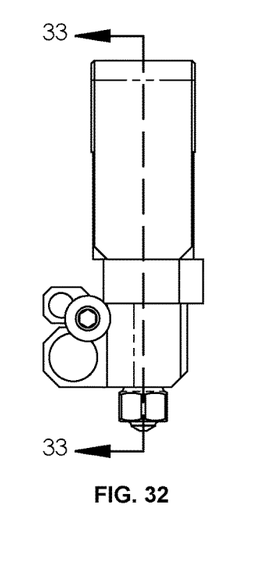
FIG. 32 is a side elevation view of an embodiment of the extrusion head of FIGS. 26 through 28.
Figure 33:
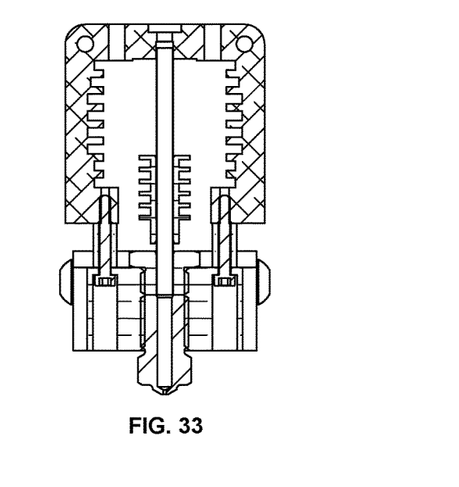
FIG. 33 is a section view taken along section lines 33-33 of FIG. 32 of an embodiment of the extrusion head of FIGS. 26 through 28.

FIGS. 1 to 33 show exemplary extrusion heads 100 for a three-dimensional printer or similar device 119 also including a supply of filament material 110, a part support base 118, and a mechanism, which can be conventional, for moving the extrusion head 100, the building table 118, or both relative to the other. The extrusion head 100 includes, for example, a cooler 101, a heater 102, a nozzle 103, a feed tube 104, a second cooler 105, a bushing 106, a spacer 107, and a tension member 108.

The feed tube 104 in this embodiment is made of metal, and extends generally axially. The feed tube 104 has an inlet 104 for receiving a forwardly driven filament 110 of solid deposition material, an outlet 111, a downstream portion 112 adjacent to the outlet 111, an upstream portion 113 upstream from the downstream portion 112, and an internal passage 114 extending from the inlet 104 to the outlet 111.

The heater 102 is thermally coupled with the downstream portion 112 for heating a filament 110 positioned within the feed tube 104 internal passage 114 to provide softened deposition material 115.

The cooler 101 is thermally coupled with the upstream portion 113 for reducing upstream heat transfer. The cooler 101 is spaced generally axially upstream from the heater 102 to define a generally axially extending gap 116 traversed by the metal feed tube 104.

A bridge 117 (for example, at least one spacer 107 or at least one tension member 108) is spaced radially from the metal feed tube 104, traversing the gap 116, and providing a rigid mechanical connection between the heater 102 and the cooler 101.

Optionally in any embodiment, the metal feed tube 104 comprises stainless steel or zirconia, and suitably can be made from hypodermic tubing.

Optionally in any embodiment, the hypodermic tubing is sized from 10×× to 14×× gauge.

Optionally in any embodiment, the metal feed tube 104 has a wall thickness from 0.001 to 0.005 in. (0.025 mm to 0.13 mm), a wall thickness less than 0.005 in. (less than 0.13 mm), or from 0.001 to 0.004 in. (0.025 mm to 0.1 mm), or from 0.002 to 0.004 in. (0.05 mm to 0.1 mm).

Optionally in any embodiment, the metal feed tube 104 has a wall cross-sectional area from 0.002 $in^2$ to 0.005 $in^2$ (1 $mm^2$ to 3 $mm^2$), or from 0.0017 $in^2$ to 0.004 $in^2$ (1.1 to 2.6 $mm^2$).

Optionally in any embodiment, the metal feed tube 104 has an inside diameter from 0.07 in. to 0.13 in. (1.8 mm to 3.3 mm), or from 0.07 in. to 0.11 in. (1.8 mm to 2.8 mm).

Optionally in any embodiment, the metal feed tube 104 has a length from 0.5 in. to 3 in. (12 mm. to 76 mm.). Optionally in any embodiment, the portion of the feed tube 104 traversing the gap 116 extends axially from 0.03 in. to 3 inches (0.8 mm. to 76 mm.).

Optionally in any embodiment, the metal feed tube 104 internal passage 114 is coated internally with a material reducing adhesion of the deposition material, for example, electroless nickel, an electroless nickel-boron composite, tungsten disulfide, molybdenum disulfide, boron nitride, diamond-like carbon, zirconium nitride, titanium nitride, or a combination of two or more of these.

Optionally in any embodiment, the heater 102 comprises a heater block comprising thermally conductive material, at least one heating element 120, and at least one temperature sensor 121 attached to and in thermal contact with the heater block 102. Optionally in any embodiment, the heater block has an axial length from 0.2 inches to 1.5 inch (5 mm. to 38 mm.). The heater block can have a threaded bore 122.

Optionally in any embodiment, the feed tube 104 downstream portion 112 has an external thread 123, and the heater block 102 threaded bore 122 and the feed tube 104 external thread 123 are engaged to thermally couple the heater block 102 with the downstream portion 112 of the feed tube 104. Alternatively, the extrusion head 100 of claim 20 includes a bushing 106 having an axial bore 124 defined by a wall secured to the feed tube 104 downstream portion 112, the bushing 106 further comprising an exterior threaded surface 125 engaged with the heater block 102 threaded bore 122. Optionally, the heater block 102 threaded bore 122 extends from an inlet 126 communicating with the feed tube downstream portion to an outlet 127.

Optionally in any embodiment, the extrusion head 100 includes a nozzle 103 secured to the heater block 102 threaded bore 122 and communicating with the outlet 127 of the heater block 102 threaded bore 122.

Optionally in any embodiment, the cooler 101 comprises a thermoelectric cooler or a heat sink comprising heat-conductive material. Optionally in any embodiment, the heat sink has at least a first thermally conductive portion 128 thermally coupled with the upstream portion 113 of the feed tube 104 and a second thermally conductive portion 129 generally radially spaced from the upstream portion 113 of the feed tube 104. Optionally in any embodiment, the heat sink has a thermally conductive flange portion 130 extending generally axially from the second thermally conductive portion 129 and parallel to and radially spaced from the feed tube 104. Optionally in any embodiment, the heat sink has at least first and second thermally conductive flange portions 130, each extending generally axially from the second thermally conductive portion 129, parallel to and radially spaced from the feed tube 104, and the first thermally conductive flange portion 130 circumferentially spaced from the second thermally conductive flange portion 130.

Optionally in any embodiment, the heat sink comprises an internal heat transfer passage 131 configured to receive a cooling fluid 132.

Optionally in any embodiment, the heat sink comprises a bore in thermal contact with the feed tube 104 along at least a portion of the gap 116.

Optionally in any embodiment, the bridge 117 comprises a generally axially extending spacer 107, spaced radially from the feed tube 104. Optionally in any embodiment, the spacer 107 has at least a first portion 134 bearing against the heater 102 and a second portion 135 bearing against the cooler 101. Optionally in any embodiment, the bridge 117 comprises first and second generally axially extending spacers 107, each spaced radially from the feed tube 104, each having at least a first portion 134 bearing against the heater 102 and a second portion 135 bearing against the cooler 101. Optionally in any embodiment, the extrusion head 100 has a third generally axially extending spacer 107, spaced radially from the feed tube 104, and having at least a first portion 134 bearing against the heater 102 and a second portion 135 bearing against the cooler 101. Optionally in any embodiment, the extrusion head 100 has a fourth generally axially extending spacer 107, spaced radially from the feed tube 104, and having at least a first portion 134 bearing against the heater 102 and a second portion 135 bearing against the cooler 101.

Optionally in any embodiment, the spacer 107 at least partially reduces mechanical loading on the feed tube 104.

Optionally in any embodiment, the spacer 107 comprises stainless steel, zirconia, or a combination of stainless steel and zirconia, for example hypodermic tubing. Examplary suitable hypodermic tubing is sized between 7 XX and 14 XX gauge, inclusive, for example, 7 XX, 8 XXX, 8 XX, 9 XXX, 9 XX, 10 XX, 11 XX, 12XX, 13 XX, 14 XX, or a combination of two or more of these. Optionally in any embodiment, the spacer 107 comprises thermal insulation material, for example, calcium silicate, ceramic, glass, an engineering thermoplastic, zirconia, mica, Portland cement or a combination of any two or more of these.

Optionally in any embodiment, the extrusion head 100 further comprises at least a first tension member 108 spaced radially from the feed tube 104 and connected to and exerting tension between the heater 102 and the cooler 101. Optionally second, third, or fourth tension members 108 can be provided.

Optionally in any embodiment, the total cross-sectional area of the tension members 108 and spacers 107 is less than 0.01 square inches (6.4 mm.$^2$). Optionally, the sum of the contact areas of the tension members and spacers with the heater is between 0.005 in.$^2$ and 0.02 in.$^2$ (0.25 mm.$^2$ and 3.2 mm. 2) and with the cooler is between 0.005 in.$^2$ and 0.02 in.$^2$ (0.25 mm.$^2$ and 3.2 mm.2).

The inventor contemplates two design tradeoffs inherent in existing all-metal extrusion head designs:

First, the heat break's thermal isolation performance is proportional to the length of and inversely proportional to the wall thickness of the thin-walled section. Poor thermal isolation results in filament softening prematurely and reduction in print quality alluded to in the '124 patent. The requirement for the heat break to carry a mechanical load is therefore at odds with its performance. The extrusion head designer must select the heat break's wall thickness to withstand reasonable incidental loads caused by machine crashes, failed prints, or human mishandling. In this manner the structural requirement put on the heat break hinders performance of the extrusion head, which in turn hinders the overall performance of the FFF machine.

Second, the hot end designer may lengthen the hot zone and select a nozzle of large bore diameter to maximize potential speed of printing, or he may shorten the hot zone and select a small-bore nozzle to maximize printing resolution. Additionally, some extrusion head designs allow users to affect the length of the hot zone by swapping or adding components. Example products: E3D V6-to-Volcano conversion kits, DisTech Prometheus V2. In all such products the overall length of the extrusion head changes when the user affects the hot zone's length, which is an undesirable side effect. A change in overall length of the extrusion head requires the user to calibrate the machine's recorded offset from nozzle to print bed. Failure to perform said calibration results in a failed print or the nozzle crashing into the print bed.

Existing all-metal extrusion heads borrow many design features from the '124 patent, and they all utilize a component known as a heat break to thermally isolate the heater block from cold components. The heat break typically:

a. Consists of a cannulated threaded rod with two threaded sections separated by a thin-walled section several millimeters in length, b. Features a thin-walled section with inner diameter and wall thickness typically in the range specified by the '124 patent for the thin-walled tube, c. Is made of stainless steel, d. Connects to a finned heatsink or a liquid cooling system, and e. Is the only component connecting the heater block to cold components. I.e. the heat break not only functions as a thermal isolator but also as the mechanical structure carrying the heater block.

In the present improved extrusion head for FFF systems, the liquefier component can be formed of a single piece of thin-wall tubing pressed, brazed, or welded to a bushing of varying length. The thin-walled tube acts as both the hot zone and the cold zone of the liquefier. The inlet of the thin-walled tube slip-fits into a hole in the cold section. The thin-walled tube can be swagged, brazed or welded to a bushing in thermal contact with the heating block. The inlet of a removable nozzle can seal with the outlet of the bushing. The heating block and bushing are made of heat conductive materials, such as aluminum alloys or copper alloys, preferably a chromium copper alloy due to its combination of thermal conductivity and high strength at the highest temperature ranges commonly encountered in FFF applications.

Unlike other all-metal hot ends, the thin-walled tube does not need to be a structural member. Nor does the tube need to cantilever from an externally supported heater block as described in the '124 patent. Since it optionally can be partially or completely relieved of mechanical loading, the wall thickness of the tube can be greatly reduced to improve its thermal isolation performance. The tube's wall thickness is in the range of 0.001 to 0.005 inches. The tube thickness used in prototypes has been 0.003 inches, in the form of commercially available 14xx gauge hypodermic tubing made of stainless steel. Such a drastic reduction in the heat break's wall thickness optionally removes the need for a finned heatsink component or liquid cooling system and reduces the fan size needed to keep the cold zone cool. The overall length and girth of the extrusion head may be reduced, conserving valuable space in a typically crowded area of the FFF system, and the overall mass may be reduced.

Bushings of varying length may be user-installed to effectively shorten or lengthen the hot zone, to affect the speed/resolution trade off described above. In arrangement employed in the present invention, the bushing extends upward in the direction of the cold zone rather than down below the heater block. In this manner, bushings of various lengths may be used without affecting the overall length of the hot end, preserving the recorded offset to the print bed, and preventing the need for the user to recalibrate the machine after making adjustments.

The heater block optionally connects to cold zone components via two to four standoffs and zero to four screws. Optionally, three screws with three standoffs or the preferable two screws with four standoffs can be used. The standoffs are preferably made of thin-walled tubes or small-diameter rods, and the screws are of small cross-sectional area. The standoffs may be constructed off blocks of rigid insulation materials such as calcium silicate based materials. Preferably the standoffs and screws incorporate materials with a high ratio of strength to thermal conductivity, such as stainless steel or zirconia. The structural components connecting the cold and hot zones are loaded only in compression (standoffs) and tension (screws) to resist the rapidly-changing axial push-pull forces applied by the filament feed system. Components between hot and cold zones are not loaded in bending, providing maximum axial rigidity for a given axial cross-sectional area of the standoff components. The total cross-sectional area of the standoff structure optionally is minimized to minimize the heat flowing from the heater block to cold zone components. For all prototypes of the present invention, this cross-section was less than 0.01 square inches in area and the structure consisted of stainless steel screws and tubular standoffs.

Optionally, the cold section is composed of a hollow heatsink component of a basically square outer shape, with inward-facing slits for heat dissipation by convection. This component's nominal wall thickness excluding the slits is roughly one fifth the overall width of the square hollow component, and this component is made of aluminum alloy. Above this component an adapter is attached to guide the filament from the feed system into the thin-walled feed tube. The ideal geometry for this adapter is specific to the FFF system. Use of an adapter allows the extrusion head to be installed on a wide variety of makes and models of FFF systems. Since the adapter is located at the coldest region of the extrusion head, it need not be made of metal. Users are free to design and make their own adapters via FFF or any manufacturing method convenient to them.

Optionally, commercially available stainless steel hypodermic tubing is used for the standoffs. Four of these standoffs lightly press into mating counter bores in the cold section and in the heater block. A pair of M1.4×0.3 screws pulls the heater block toward the cold section, establishing the compressive forces in the standoffs. The tube optionally is pressed into the bushing, which optionally threads into the heater block.

Optionally, a heatsink is pressed onto the thin-walled tube. Performance is not noticeably affected by omission of this heatsink.

Optionally, the heater block is made of chromium copper (aka C182) and is coated with Cerakote Glacier Series ceramic coating. The coating reduces heat lost via convection and radiation. Electroless nickel plating would also work well due to its low thermal emissivity.

I claim:

1. An extrusion head for a three-dimensional printer, the extrusion head comprising:
    a generally axially extending metal feed tube having an inlet for receiving a forwardly driven filament of solid deposition material, an outlet, a downstream portion adjacent to the outlet, an upstream portion upstream from the downstream portion, and an internal passage extending from the inlet to the outlet;
    a heater thermally coupled with the downstream portion for heating a filament positioned within the feed tube internal passage to provide softened deposition material;
    a cooler thermally coupled with the upstream portion for reducing upstream heat transfer, the cooler spaced generally axially upstream from the heater; and
    a generally axially extending gap, bound by a bridge traversing the gap between the cooler and the heater; wherein,
    the gap is traversed by the metal feed tube;
    the bridge is spaced radially and apart from the metal feed tube, the bridge provides a rigid mechanical connection between the heater and the cooler, and the bridge at least partially reduces mechanical loading on the feed tube, wherein the bridge comprises:
        a first structural component, spaced radially and apart from the feed tube, and having a first portion bearing against the heater and a second portion bearing against the cooler, wherein the first structural component at least partially relieves mechanical loading on the feed tube; and
        a second structural component, spaced radially and apart from the feed tube, and having a first portion bearing against the heater and a second portion bearing against the cooler, wherein the second structural component at least partially relieves mechanical loading on the feed tube.

2. The extrusion head of claim 1, wherein at least one of the first structural component or the second structural component is a spacer or tension member.

3. The extrusion head of claim 1, wherein the bridge further comprises a third structural component, spaced radially and apart from the feed tube, and having a first portion bearing against the heater and a second portion bearing against the cooler, wherein the third structural component at least partially relieves mechanical loading on the feed tube.

4. The extrusion head of claim 1, wherein the metal feed tube comprises stainless steel.

5. The extrusion head of claim 4, wherein the metal feed tube comprises hypodermic tubing.

6. The extrusion head of claim 1, wherein the metal feed tube has a wall thickness less than 0.005 in. (less than 0.13 mm).

7. The extrusion head of claim 1, wherein the metal feed tube has an inside diameter from 0.07 in. to 0.13 in. (1.8 mm to 3.3 mm).

8. The extrusion head of claim 1, wherein the metal feed tube has a length from 0.5 in. to 3 in. (12 mm. to 76 mm.).

9. The extrusion head of claim 1, wherein the portion of the feed tube traversing the gap extends axially from 0.03 in. to 3 inches (0.8 mm. to 76 mm.).

10. The extrusion head of claim 1, wherein the metal feed tube internal passage is coated internally with a material reducing adhesion of the deposition material.

11. The extrusion head of claim 10, wherein the material reducing adhesion of the deposition material is electroless nickel, an electroless nickel-boron composite, tungsten disulfide, molybdenum disulfide, boron nitride, diamond-like carbon, zirconium nitride, titanium nitride, or a combination of two or more of these.

12. The extrusion head of claim 1, further comprising a bushing having an axial bore defined by a wall secured to the feed tube downstream portion, the bushing further comprising an exterior threaded surface engaged with the heater block threaded bore.

13. The extrusion head of claim 12, wherein a line drawn from the first structural component to the second structural component passes through the bushing.

14. The extrusion head of claim 1, wherein the first structural component and the second structural component of the bridge are each loaded in either compression or tension to resist the axial push-pull forces applied by the filament feed system.

15. The extrusion head of claim 1, wherein the cooler comprises a heat sink comprising heat-conductive material.

16. The extrusion head of claim 1, wherein the cooler comprises a heat sink comprising heat-conductive material and comprising an internal heat transfer passage configured to receive a cooling fluid.

17. The extrusion head of claim 1, wherein at least one structural component comprises hypodermic tubing.

18. The extrusion head of claim 17, wherein the hypodermic tubing is sized between 7 XX and 14 XX gauge, inclusive.

19. The extrusion head of claim 1, wherein at least one structural component comprises thermal insulation material.

20. The extrusion head of claim 19, wherein the thermal insulation material is calcium silicate, ceramic, glass, an engineering thermoplastic, zirconia, mica, Portland cement or a combination of any two or more of these.

* * * * *